US012781413B2

(12) United States Patent
Goshgarian et al.

(10) Patent No.: US 12,781,413 B2
(45) Date of Patent: Nov. 3, 2026

(54) LAUNDRY MACHINE AND CORRESPONDING CLUTCH SYSTEM

(71) Applicant: WHIRLPOOL CORPORATION, Benton Harbor, MI (US)

(72) Inventors: David Goshgarian, Saint Joseph, MI (US); Brian Heine, Saint Joseph, MI (US); David Hoff, Saint Joseph, MI (US); Bradley D. Morrow, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 47 days.

(21) Appl. No.: 18/906,823

(22) Filed: Oct. 4, 2024

(65) Prior Publication Data

US 2026/0098372 A1 Apr. 9, 2026

(51) Int. Cl.
*D06F 37/40* (2006.01)
*F16D 23/12* (2006.01)

(52) U.S. Cl.
CPC ............ *D06F 37/40* (2013.01); *F16D 23/12* (2013.01); *F16D 2023/123* (2013.01)

(58) Field of Classification Search
CPC ........................................................ D06F 37/40
See application file for complete search history.

(56) References Cited

U.S. PATENT DOCUMENTS

| | | | |
|---|---|---|---|
| 5,172,573 A | 12/1992 | Sharp et al. | |
| 10,670,086 B2 | 6/2020 | Wittig | |
| 10,927,490 B2 | 2/2021 | Aruga | |
| 11,098,798 B2 | 8/2021 | Aruga | |
| 2019/0226573 A1* | 7/2019 | Aruga | D06F 37/40 |

FOREIGN PATENT DOCUMENTS

| | | |
|---|---|---|
| WO | 2022139536 A1 | 6/2022 |

* cited by examiner

*Primary Examiner* — David G Cormier
(74) *Attorney, Agent, or Firm* — Brooks Kushman P.C.

(57) ABSTRACT

A laundry machine includes a drum, an agitator, and a clutch. The agitator is disposed within drum. The clutch includes a sleeve and a cam ring. The sleeve is configured to transition between first and second positions to connect and disconnect the agitator to and from the drum, respectively. The sleeve has a first surface. The cam ring is operable to transition the sleeve between the first and second positions, respectively. The cam ring has a second surface and protruding regions extending upward from the second surface. The protruding regions are in engagement with the first surface of the sleeve such that the first surface of the sleeve is spaced-apart from the second surface of the cam ring.

20 Claims, 6 Drawing Sheets

LAUNDRY MACHINE AND CORRESPONDING CLUTCH SYSTEM

TECHNICAL FIELD

The present disclosure relates to washing or laundry machines.

BACKGROUND

Washing machines are configured to clean clothes, garments, or other clothing articles.

SUMMARY

A laundry machine includes a spin tube, an agitator shaft, and a clutch. The agitator shaft is disposed within the spin tube. The clutch includes a sleeve and a cam ring. The sleeve is configured to transition between lowered and elevated positions to connect and disconnect the agitator shaft to and from the spin tube, respectively. The sleeve has flange protruding radially outward therefrom. The flange has a lower surface. The cam ring is disposed radially around the sleeve. The cam ring is operable to lower and lift the sleeve to transition the sleeve between the lowered and elevated positions, respectively. The cam ring has an upper surface and standoffs extending upward from the upper surface. The standoffs are in engagement with the lower surface of the flange such that the upper surface of the cam is spaced-apart from the lower surface of the flange. The standoffs are also in engagement with the lower surface of the flange to facilitate lowering and lifting the sleeve.

A laundry machine includes a drum, an agitator, and a clutch. The agitator is disposed within drum. The clutch includes a sleeve and a cam ring. The sleeve is configured to transition between first and second positions to connect and disconnect the agitator to and from the drum, respectively. The sleeve has a first surface. The cam ring is operable to transition the sleeve between the first and second positions. The cam ring has a second surface and protruding regions extending upward from the second surface. The protruding regions are in engagement with the first surface of the sleeve such that the first surface of the sleeve is spaced-apart from the second surface of the cam ring. The protruding regions also are in engagement with the first surface of the sleeve to facilitate transitioning the sleeve between the first and second positions.

A laundry machine includes a spin tube, an agitator shaft, and a clutch. The clutch includes a sleeve and a cam. The sleeve extends along an axis. The sleeve is configured to transition between engaged and disengaged conditions to connect and disconnect the agitator shaft to and from the spin tube, respectively. The sleeve has a first surface facing in a first axial direction with respect to the axis. The cam extends along the axis and is operable to transition the sleeve between the engaged and disengaged conditions. The cam has a second surface facing in a second axial direction that is opposite to the first axial direction. The cam also has protrusions extending from the second surface. The protrusions are in engagement with the first surface such that the first surface is spaced-apart from the second surface to facilitate cooling between first and second surfaces. The protrusions are also in engagement with the first surface to facilitate transitioning the sleeve between the engaged and disengaged conditions.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Illustrative washing machines in accordance with the present disclosure include a rotatable clothes mover or agitator and a rotatable basket or drum. Clothes movers generally oscillate, or rotate back and forth, in accordance with a stroke angle, to provide agitation to a laundry load during washing operations. Clothes movers and rotatable baskets generally spin together during spin cycle operations. To enable both of these functionalities, including oscillation by the clothes mover and joint spinning by the clothes mover and basket, a common drive system may be included. Such a drive system can include a drive mechanism or transmission for translating movement from an electric machine or motor into rotational movement of the basket and clothes mover by the use of a drive shaft that is operably coupled to a series of gears or gearing arrangement. Traditional drive mechanisms may include the use of a sun gear, a set of planetary gears, and an external ring gear. The planetary gears are often provided as spur gears. However, the gears may alternatively be helical gears in place of conventional spur gears in the drive mechanism. Traditional drive mechanisms, however, are not limited to planetary gear systems.

Figure 1:
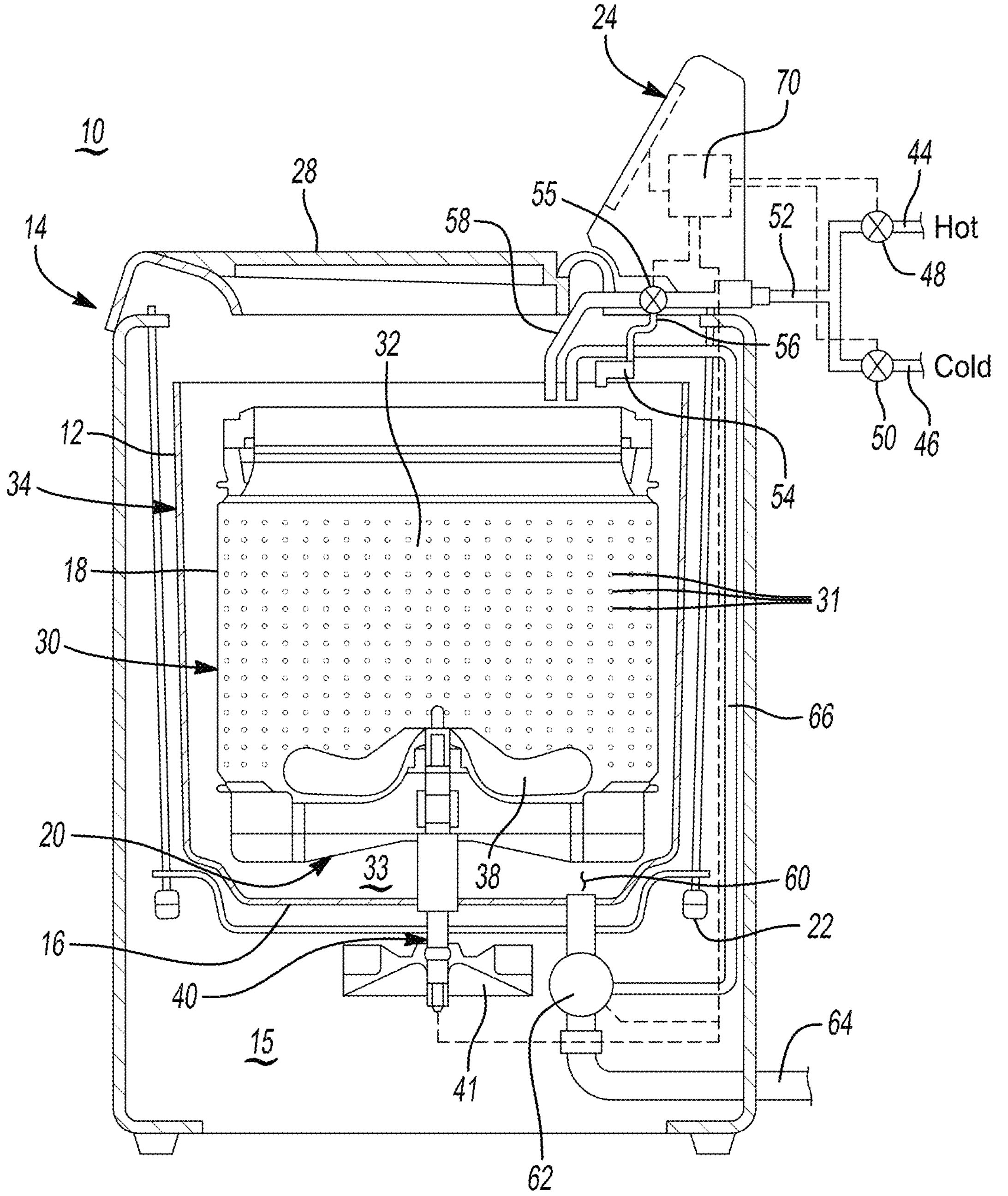
FIG. 1 illustrates a schematic cross-sectional view of a laundry treating appliance in the form of a laundry or washing machine according to the present disclosure.

FIG. 1 illustrates a schematic cross-sectional view of a laundry treating appliance shown in the form of a laundry or washing machine 10 according to one embodiment of the present disclosure. While the laundry treating appliance is illustrated as a vertical axis, top-fill washing machine, the embodiments of the present disclosure can have applicability in other fabric treating appliances, non-limiting examples of which include a combination washing machine and dryer, a refreshing/revitalizing machine, an extractor, or a non-aqueous washing apparatuses.

Washing machines are typically categorized as either a vertical axis washing machine or a horizontal axis washing machine. As used herein, the "vertical axis" washing machine refers to a washing machine having a rotatable drum, perforate or imperforate, that holds fabric items and a clothes mover, such as an agitator, impeller, nutator, and the like within the drum. The clothes mover moves within the drum to impart mechanical energy directly to the clothes or indirectly through wash liquid in the drum. The clothes mover may typically be moved in a reciprocating rotational movement. In some vertical axis washing machines, the drum rotates about a vertical axis generally perpendicular to a surface that supports the washing machine. However, the rotational axis need not be vertical. The drum may rotate about an axis inclined relative to the vertical axis. As used herein, the "horizontal axis" washing machine refers to a washing machine having a rotatable drum, perforated or imperforate, that holds fabric items and washes the fabric items by the fabric items rubbing against one another as the drum rotates. In some horizontal axis washing machines, the drum rotates about a horizontal axis generally parallel to a surface that supports the washing machine. However, the rotational axis need not be horizontal. The drum may rotate about an axis inclined relative to the horizontal axis. In horizontal axis washing machines, the clothes are lifted by the rotating drum and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric articles. The illustrated exemplary washing machine of FIG. 1 is a vertical axis washing machine.

The washing machine 10 may include a structural support system comprising a cabinet 14 that defines an interior space or internal cavity 15, within which a laundry holding system resides. The cabinet 14 may be a housing having a chassis and/or a frame defining an interior that receives components typically found in a conventional washing machine, such as electric machines (e.g., motors), pumps, fluid lines, controls, sensors, transducers, and the like. Such components will not be described further herein except as necessary for a complete understanding of the present disclosure.

The fabric holding system of the illustrated exemplary washing machine 10 may include a rotatable drum (e.g., spin drum) or basket 30 having an open top that can be disposed within the interior of the cabinet 14 (e.g., within internal cavity 15) and may define a second internal space, internal cavity, or treating chamber 32 for receiving laundry articles or items for treatment. The top of the cabinet 14 can include a selectively openable lid 28 to provide access into the laundry treating chamber 32 through the open top of the basket 30. A washtub or tub 34 can also be positioned within the internal cavity 15 defined by the cabinet 14 and can define a third interior space or internal cavity 33 within which the basket 30 can be positioned. The tub 34 can have a generally cylindrical side or tub peripheral wall 12 closed at its bottom end by a base 16 that can at least partially define a sump 60.

The basket 30 can have a generally peripheral side wall 18, which is illustrated as a cylindrical side wall, closed at the basket end by a basket base 20 to at least partially define the treating chamber 32. The basket 30 can be rotatably mounted within the tub 34 for rotation about a vertical basket axis of rotation relative to the tub 34 and can include a plurality of perforations 31, such that liquid may flow between the tub 34 and the rotatable basket 30 through the perforations 31. While the illustrated washing machine 10 includes both the tub 34 and the basket 30, with the basket 30 defining the treating chamber 32, it is within the scope of the present disclosure for the laundry treating appliance to include only one receptacle, with the receptacle defining the laundry treatment chamber for receiving the load to be treated.

An agitator or clothes mover 38 may be disposed and rotatably mounted within the basket 30 to impart mechanical agitation to a load of laundry placed in the basket 30. The clothes mover 38 can be oscillated or rotated about its axis of rotation during a cycle of operation in order to produce load motion effective to wash the load contained within the treating chamber 32. Types of laundry movers include, but are not limited to, an agitator, a wobble plate, and a hybrid impeller/agitator.

The basket 30 and the clothes mover 38 may be driven by a drive system 40 that includes power sources, such as an electric machine or motor 41, and a transmission operably coupled with the basket 30 and clothes mover 38. The electric machine or motor 41 is configured to generate power to rotate the basket 30 and the clothes mover 38, and to oscillate the clothes mover 38. The transmission is configured to deliver power from a power source (e.g., motor 41) to the basket 30 and/or the clothes mover 38. The transmission may include a gearing arrangement or gear case. The transmission may also include additional components such as input and output shafts. The motor 41 may rotate the basket 30 at various speeds in either rotational direction about the vertical axis of rotation, including at a spin speed wherein a centrifugal force at the inner surface of the basket side wall 18 is 1 g or greater. Spin speeds are commonly known for use in extracting liquid from the laundry items in the basket 30, such as after a wash or rinse step in a treating cycle of operation. A loss motion device or clutch can be included in the drive system 40 and can selectively operably couple the motor 41 with either the basket 30 and/or the clothes mover 38.

A suspension system 22 can dynamically hold the tub 34 within the cabinet 14. The suspension system 22 can dissipate a determined degree of vibratory energy generated by the rotation of the basket 30 and/or the clothes mover 38 during a treating cycle of operation. Together, the tub 34, the basket 30, and any contents of the basket 30, such as liquid and laundry items, define a suspended mass for the suspension system 22.

A liquid supply system can provide liquid, such as water or a combination of water and one or more wash aids, such as detergent, into the treating chamber 32. The liquid supply system may include a water supply configured to supply hot or cold water. The water supply may include a hot water inlet 44 and a cold water inlet 46, a valve assembly, which can include a hot water valve 48, a cold water valve 50, and a diverter valve 55, and various conduits 52, 56, 58. The valves 48, 50 are selectively openable to provide water, such as from a household water supply (not shown) to the conduit 52. The valves 48, 50 can be opened individually or together to provide a mix of hot and cold water at a selected temperature. While the valves 48, 50 and conduit 52 are illustrated as positioned on the exterior of the cabinet 14, it may be understood that these components may be internal to the housing.

As illustrated, a detergent dispenser 54 can be fluidly coupled with the conduit 52 through a diverter valve 55 and a first water conduit 56. The detergent dispenser 54 can include means for supplying or mixing detergent to or with water from the first water conduit 56 and can supply such treating liquid to the tub 34. It has been contemplated that water from the first water conduit 56 can also be supplied to the tub 34 through the detergent dispenser 54 without the addition of a detergent. A second water conduit, illustrated as a separate water inlet 58, can also be fluidly coupled with the conduit 52 through the diverter valve 55 such that water can be supplied directly to the treating chamber through the open top of the basket 30. Additionally, the liquid supply system can differ from the configuration shown, such as by inclusion of other valves, conduits, wash aid dispensers, heaters, sensors, such as water level sensors and temperature sensors, and the like, to control the flow of treating liquid through the washing machine 10 and for the introduction of more than one type of detergent/wash aid.

A liquid recirculation system may be provided for recirculating liquid from the tub 34 into the treating chamber 32. More specifically, a sump 60 can be located in the bottom of the tub 34 and the liquid recirculation system can be configured to recirculate treating liquid from the sump 60 onto the top of a laundry load located in the treating chamber 32. A pump 62 can be housed below the tub 34 and can have an inlet fluidly coupled with the sump 60 and an outlet configured to fluidly couple to either or both a household drain 64 or a recirculation conduit 66. In this configuration, the pump 62 can be used to drain or recirculate wash water in the sump 60. As illustrated, the recirculation conduit 66 can be fluidly coupled with the treating chamber 32 such that it supplies liquid into the open top of the basket 30. The liquid recirculation system can include other types of recirculation systems.

It is noted that the illustrated drive system, suspension system, liquid supply system, and recirculation and drain system are shown for exemplary purposes only and are not limited to the systems shown in the drawings and described above. For example, the liquid supply, recirculation, and pump systems can differ from the configuration shown in FIG. 1, such as by inclusion of other valves, conduits, treating chemistry dispensers, sensors (such as liquid level sensors and temperature sensors), and the like, to control the flow of liquid through the washing machine 10 and for the introduction of more than one type of treating chemistry. For example, the liquid supply system can be configured to supply liquid into the interior of the tub 34 not occupied by the basket 30 such that liquid can be supplied directly to the tub 34 without having to travel through the basket 30. In another example, the liquid supply system can include a single valve for controlling the flow of water from the household water source. In another example, the recirculation and pump system can include two separate pumps for recirculation and draining, instead of the single pump as previously described.

The washing machine 10 can also be provided with a heating system (not shown) to heat liquid provided to the treating chamber 32. In one example, the heating system can include a heating element provided in the sump to heat liquid that collects in the sump. Alternatively, the heating system can be in the form of an in-line heater that heats the liquid as it flows through the liquid supply, dispensing and/or recirculation systems.

The washing machine 10 may further include a controller 70 coupled with various working components of the washing machine 10 to control the operation of the working components and to implement one or more treating cycles of operation. The control system can further include a user interface 24 that is operably coupled with the controller 70. The user interface 24 can include one or more knobs, dials, switches, displays, touch screens and the like for communicating with the user, such as to receive input and provide output. The user can enter different types of information including, without limitation, cycle selection and cycle parameters, such as cycle options.

The controller 70 can include the machine controller and any additional controllers provided for controlling any of the components of the washing machine 10. For example, the controller 70 can include the machine controller and a motor controller. Many known types of controllers can be used for the controller 70. It is contemplated that the controller is a microprocessor-based controller that implements control software and sends/receives one or more electrical signals to/from each of the various working components to implement the control software. As an example, proportional control (P), proportional integral control (PI), and proportional derivative control (PD), or a combination thereof, a proportional integral derivative control (PID), can be used to control the various components of the washing machine 10.

Figure 2:
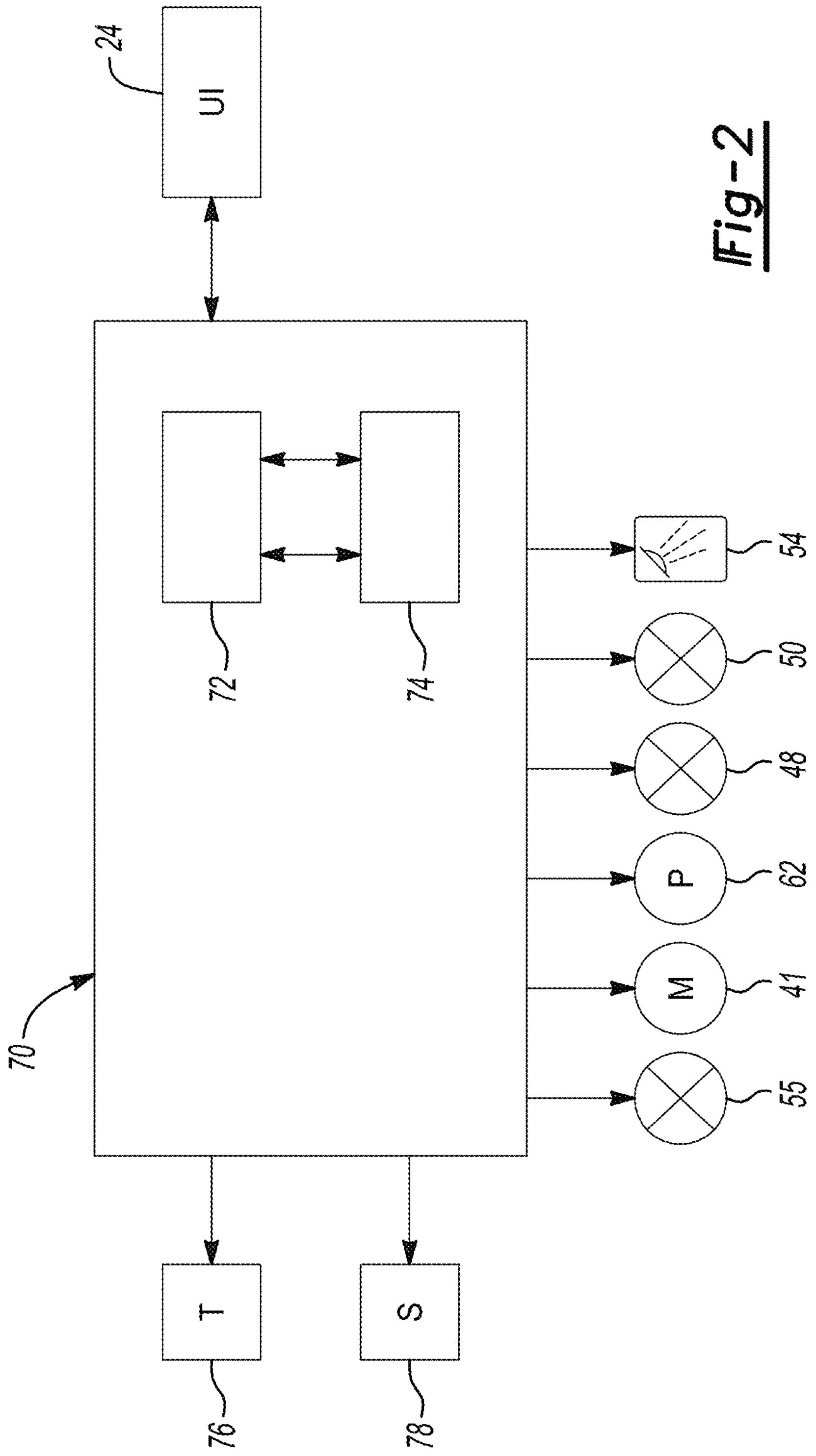
FIG. 2 illustrates a schematic representation of a controller for controlling the operation of one or more components of the laundry treating appliance.

As illustrated in FIG. 2, the controller 70 can be provided with a memory 72 and a central processing unit (CPU) 74. The memory 72 can be used for storing the control software that can be executed by the CPU 74 in completing a cycle of operation using the washing machine 10 and any additional software. Examples, without limitation, of treating cycles of operation include: wash, heavy-duty wash, delicate wash, quick wash, pre-wash, refresh, rinse only, and timed wash, which can be selected at the user interface 24. The memory 72 can also be used to store information, such as a database or table, and to store data received from the one or more components of the washing machine 10 that can be communicably coupled with the controller 70. The database or table can be used to store the various operating parameters for the one or more cycles of operation, including factory default values for the operating parameters and any adjustments to them by the control system or by user input.

The controller 70 may be operably coupled with one or more components of the washing machine 10 for communicating with and/or controlling the operation of the components to complete a cycle of operation. For example, the controller 70 may be coupled with the hot water valve 48, the cold water valve 50, diverter valve 55, and the detergent dispenser 54 for controlling the temperature and flow rate of treating liquid into the treating chamber 32; the pump 62 for controlling the amount of treating liquid in the treating chamber 32 or sump 60; drive system 40 including motor 41 for controlling the direction and speed of rotation of the basket 30 and/or the clothes mover 38; and the user interface 24 for receiving user selected inputs and communicating information to the user. The controller 70 can also receive input from a temperature sensor 76, such as a thermistor, which can detect the temperature of the treating liquid in the treating chamber 32 and/or the temperature of the treating liquid being supplied to the treating chamber 32. The controller 70 can also receive input from various additional sensors 78, which are known in the art and not shown for simplicity. Non-limiting examples of additional sensors 78 that can be communicably coupled with the controller 70 include: a weight sensor, and a motor torque sensor.

While illustrated as one controller, the controller 70 may be part of a larger control system and may control or be controlled by various other controllers throughout the washing machine 10. It should therefore be understood that the controller 70 and one or more other controllers can collectively be referred to as a "controller" that controls various subcomponents or actuators of the washing machine 10 in response to signals from various subcomponents or sensors of the washing machine 10 to control various functions. The controller 70 may include the microprocessor or central processing unit (CPU) 74, which may be in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 70 in controlling the washing machine 10.

Control logic or functions performed by the controller 70 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, such as controller 70. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the washing machine 10 or its subsystems. The computer-readable storage devices or media may include one or more of a number of known physical devices which utilize electric, magnetic, and/or optical storage to keep executable instructions and associated calibration information, operating variables, and the like.

Figure 3A:
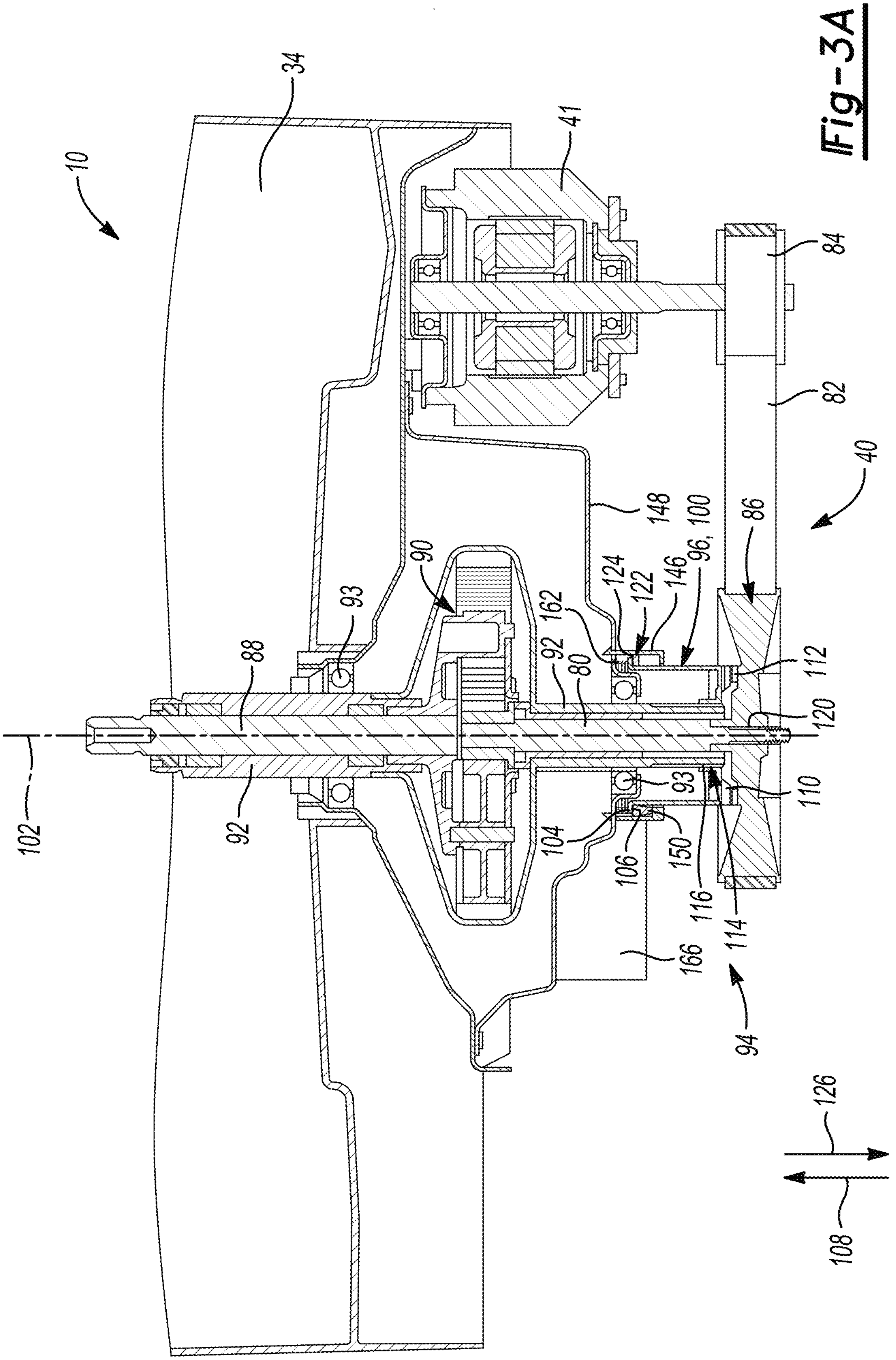
FIGS. 3A and 3B are partial cross-sectional views of the lower end of laundry treating appliance illustrating a drive system for the laundry treating appliance and different positions of a clutch system.
Figure 3B:
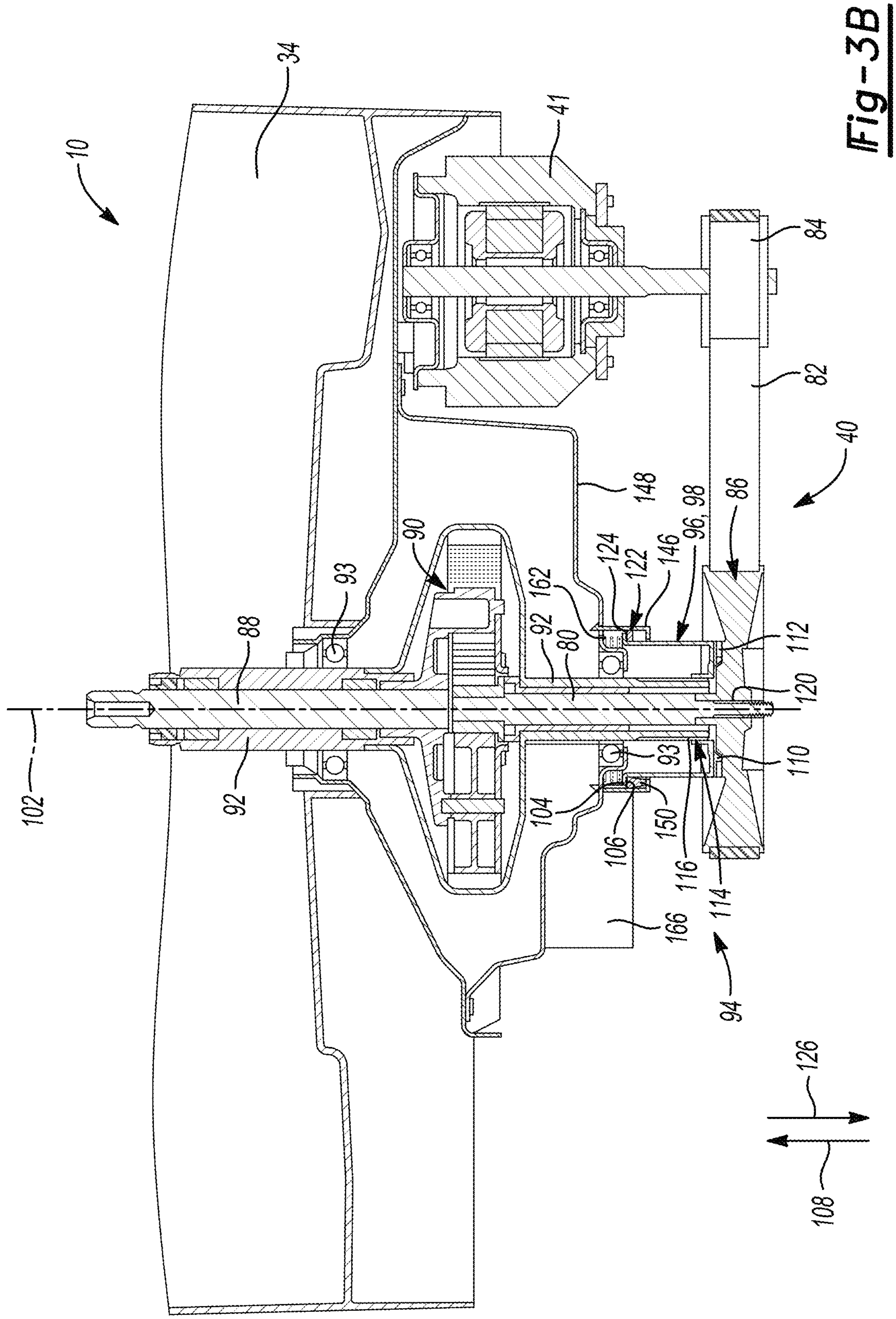
Figure 4:
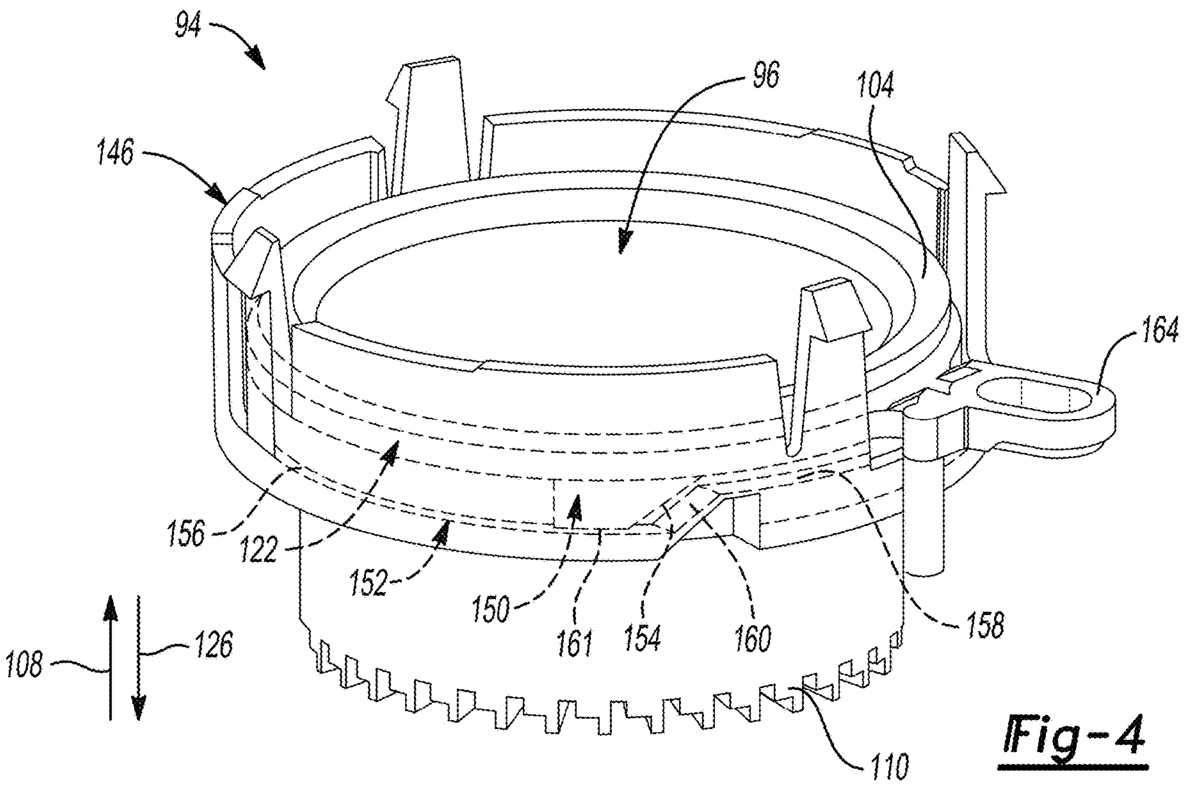
FIG. 4 is a perspective view illustrating various elements of the clutch system.
Figure 5:
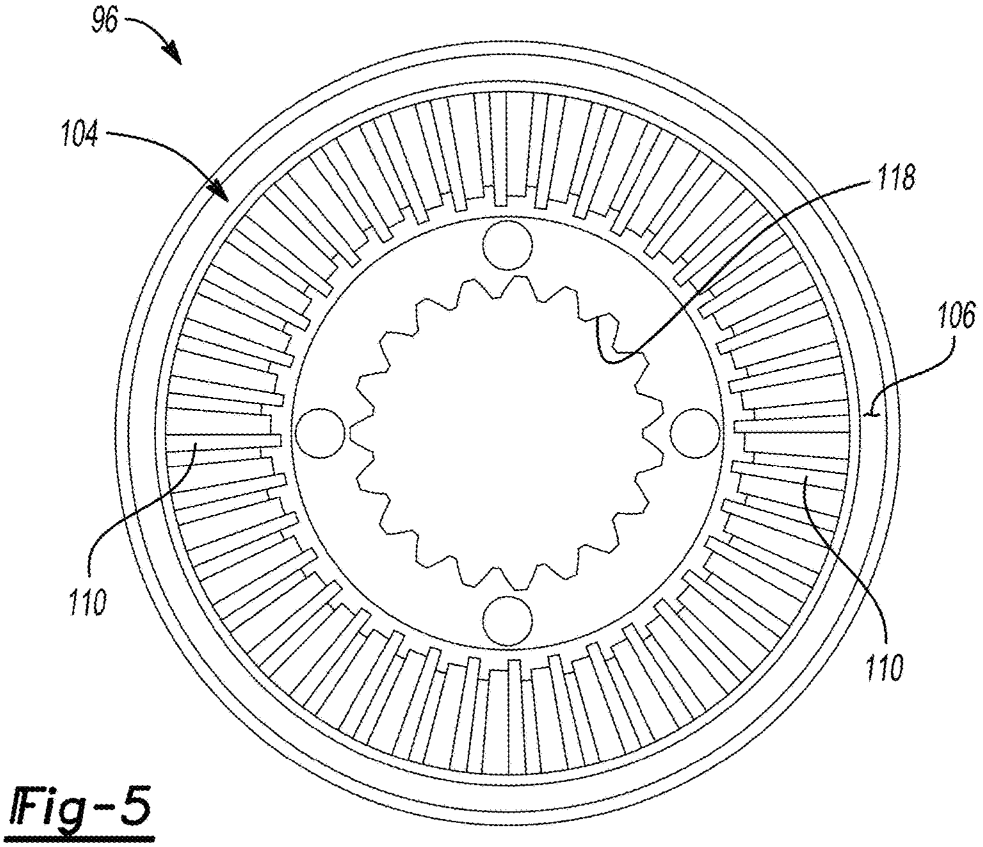
FIG. 5 is a bottom view of a sleeve that is a subcomponent of the clutch system.
Figure 6:
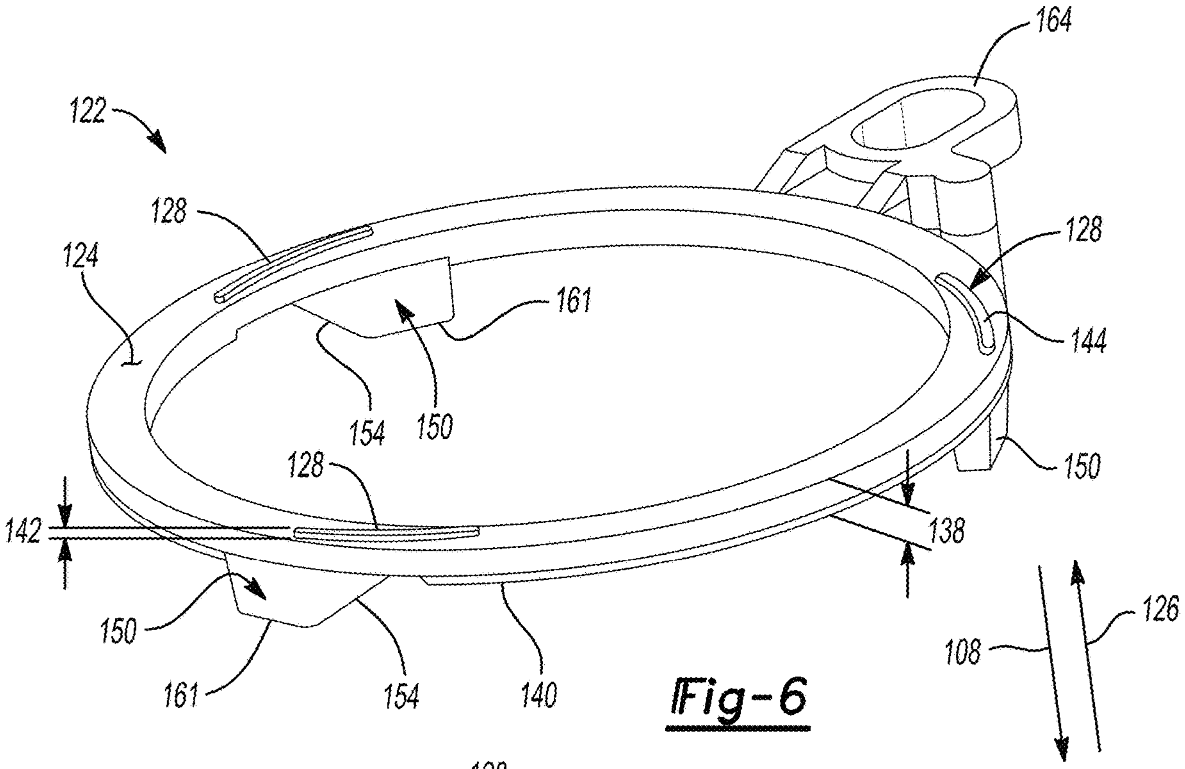
FIG. 6 is a perspective view of a cam ring that is a subcomponent of the clutch system.
Figure 7:
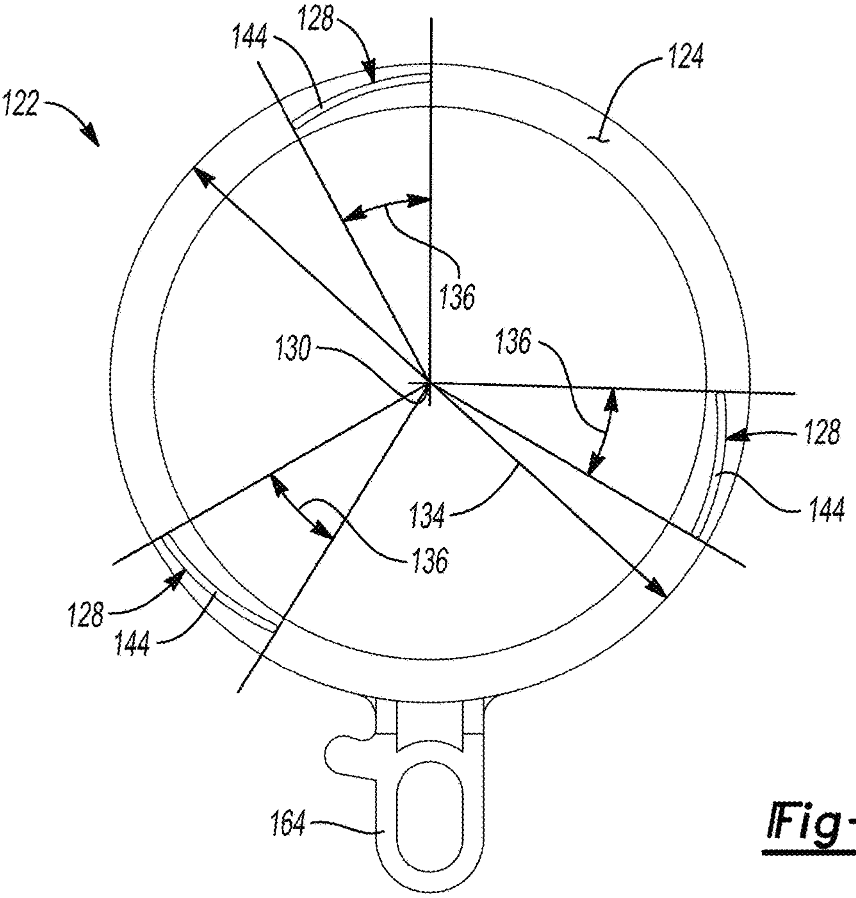
FIG. 7 is a top view the cam ring.

Referring to FIGS. 3A and 3B, the drive system 40 is illustrated in further detail. Please note that the configuration of the drive system 40 may be the same or may vary in FIGS. 3A and 3B relative to the configuration of the drive system 40 illustrated in FIG. 1. Also, please note that for illustrative purposes, some of the components in FIGS. 3A and 3B may be shown in a cross-section while other components are not.

The drive system 40 includes the motor 41. The motor 41 delivers power to an input shaft 80 via a belt 82. The belt 82 engages a first pulley 84 that is attached to the shaft of the motor 41 and engages a second pulley 86 that is attached to the input shaft 80, to form a power path from the motor 41 to the input shaft 80. Alternatively, the motor 41 may be connected directly to the input shaft 80. The input shaft 80 is connected to an agitator shaft 88 via a transmission 90. The transmission 90 is configured to transform rotational motion of the input shaft 80 in one rotational direction into an oscillating motion in opposing (e.g., opposite) rotational directions on the agitator shaft 88. The agitator shaft 88 may be connected to an agitator (e.g., the clothes mover 38).

A spin shaft or spin tube 92 is connected to the rotatable drum or basket 30. The spin tube 92 and basket 30 are collectively rotatable relative to the tub 34 via bearings 93. A clutch or clutch system 94 is configured to connect and disconnect the spin tube 92 to and from the input shaft 80. When the clutch system 94 is disengaged (e.g., when the spin tube 92 is disconnected from the input shaft 80), a power path flows from the motor 41 to the input shaft 80, through the transmission 90, and to the agitator shaft 88 to oscillate the agitator shaft 88 and clothes mover 38 back in forth in opposing rotational directions, while the spin tube 92 and basket 30 remain motionless. The clutch system 94 may be disengaged during an agitation cycle of the washing machine 10. When the clutch system 94 is engaged (e.g., when the spin tube 92 is connected to the input shaft 80), the input shaft 80, the agitator shaft 88, the transmission 90, the spin tube 92, the basket 30, and the clothes mover 38 may be constrained to rotate in unison in one rotational direction. It is noted that the spin tube 92 may form an external housing or case that houses the components (e.g., gears and other associated components) of the transmission 90. The input shaft 80 and the agitator shaft 88 may also be disposed within the spin tube 92. Furthermore, when the clutch system 94 is engaged, a power path flows from the motor 41, through the spin tube 92, and to the basket 30 to rotate the basket 30 in one rotational direction. The clutch system 94 may be engaged during a spin cycle of the washing machine 10.

In some configurations the transmission 90 may be eliminated or may operate as a gear reduction between the input shaft 80 and the agitator shaft 88. In such configurations where the transmission 90 is eliminated or where the transmission 90 operates as a gear reduction, the motor 41 would be operated to oscillate between first and second rotational directions (e.g., clockwise and counterclockwise directions) during the agitation cycle in order to oscillate the agitator shaft 88 and clothes mover 38 in the first and second rotational directions. Also, in such configurations where the transmission 90 is eliminated or where the transmission 90 operates as a gear reduction, the motor 41 would be operated to spin in one rotational direction (e.g., the clockwise direction or the counterclockwise direction) during the spin cycle to rotate the spin tube 92 and basket 30. The motor 41, spin tube 92, and basket 30 may be rotated in either the first rotational direction or the second rotational direction during the spin cycle. In configurations where the transmission 90 is eliminated, the input shaft 80 and the agitator shaft 88 may be combined to form a single shaft.

Referring to FIGS. 3A-7, the clutch system 94 is illustrated in further detail. The clutch system 94 includes a clutch sleeve 96. The clutch sleeve 96 may also be referred to as the clutch or the sleeve. The clutch sleeve 96 is configured to connect and disconnect the spin tube 92 (and ultimately the basket 30) to and from the motor 41 and a corresponding power path from the motor 41, respectively. More specifically, the clutch sleeve 96 is configured to transition between an engaged state or condition corresponding to a first position 98 of the clutch sleeve 96 (e.g., FIG. 3B) and a disengaged state or condition corresponding to second position 100 of the clutch sleeve 96 (e.g., FIG. 3A) to connect and disconnect the spin tube 92 (and ultimately the basket 30) to and from the motor 41 and a corresponding a power path from the motor 41, respectively. The first position 98 may correspond to a lowered position of the clutch sleeve 96 while the second position 100 may correspond to an elevated position of the clutch sleeve 96.

It is noted that when the clutch sleeve 96 is in the first position 98, the input shaft 80, the agitator shaft 88, the transmission 90, the spin tube 92, the basket 30, and the clothes mover 38 may be constrained to rotate in unison in one rotational direction. It is also noted that when the clutch sleeve 96 is in the second position 100, a power path flows from the motor 41 to the input shaft 80, through the transmission 90, and to the agitator shaft 88 to oscillate the agitator shaft 88 and clothes mover 38 back in forth in opposing rotational directions, while the spin tube 92 and basket 30 remain motionless.

The clutch sleeve 96 extends along an axis 102. It is noted that axis 102 may also correspond to the axis about which the input shaft 80, the agitator shaft 88, the transmission 90, the spin tube 92, the basket 30, and the clothes mover 38 all rotate. The clutch sleeve 96 may include a flange 104 protruding radially outward therefrom relative to axis 102. The flange 104 may be positioned along an axial end of the clutch sleeve 96 (e.g., an end of the clutch sleeve 96 along axis 102). The flange 104 may have a surface 106 facing in a first axial direction 108 with respect to the axis 102. The surface 106 may be a lower surface of the flange 104.

The clutch sleeve 96 may include teeth or serrations 110 that engage opposing teeth or serrations 112 on the second pulley 86 when the clutch sleeve 96 is in the first position 98, which corresponds to the engaged state, to connect the spin tube 92 to the input shaft 80 via the second pulley 86 such that the spin tube 92 and the input shaft 80 are constrained to rotate in unison. The teeth or serrations 110 on the clutch sleeve 96 disengage the opposing teeth or serrations 112 on the second pulley 86 when the clutch sleeve 96 is in the second position 100, which corresponds to the disengaged state, such that the spin tube 92 is disconnected from the input shaft 80 and second pulley 86, and such that the spin tube 92 and the input shaft 80 are not constrained to rotate in unison. The teeth or serrations 110 on the clutch sleeve 96 and/or the teeth or serrations 112 on the second pulley 86 may include steps to facilitate gradual engagement between the clutch sleeve 96 and the second pulley 86. The clutch sleeve 96 may be secured to the spin tube 92 via a first splined connection 114 such that clutch sleeve 96 and spin tube 92 are constrained to rotate in unison. The clutch sleeve 96 may be slidable along the first splined connection 114 to transition between the first position 98 and the second position 100. The splined first connection 114 may correspond to splines 116 defined on the spin tube 92 engaging a splined orifice 118 defined by the sleeve 96. The second pulley 86 may be secured to the input shaft 80 via a second splined connection 120 such that the second pulley 86 and the input shaft 80 are constrained to rotate in unison.

The clutch system 94 includes a cam or cam ring 122. The cam ring 122 also extends along axis 102. The cam ring 122 may be disposed radially around the sleeve 96 with respect to axis 102. The cam ring 122 is operable to transition the sleeve 96 between the first position 98 and the second position 100. More specifically, the cam ring 122 may be operable to lower and lift the sleeve 96 to transition the sleeve between lowered and elevated positions, respectively. Such lowered and elevated positions may correspond to the first and second positions 98, 100, respectively. The cam ring 122 may include a surface 124 facing in a second axial direction 126 with respect to the axis 102. The second axial direction 126 may be opposite to the first axial direction 108. The surface 124 may be an upper surface of the cam ring 122. Surface 106 and surface 124 may be referred to as first and second surfaces, respectively, or vice versa. Surface 124 may be positioned opposite to surface 106 such that surface 124 faces surface 106.

The cam ring 122 may include standoffs, protruding regions, or protrusions 128 that extend from surface 124. More specifically, the protrusions 128 may extend upward from surface 124 and many extend in the second axial direction 126 with respect to the axis 102. A standoff may refer to a device that maintains a fixed distance between two objects, especially between a surface and another object. Here, the protrusions 128 may operate to maintain a fixed distance between the surface 124 on the cam ring 122 and the surface 106 on the flange 104. The protrusions 128 may be in engagement with surface 106 on the flange 104.

Such engagement between the protrusions 128 and surface 106 on the flange 104 may operate to space-apart surface 106 from surface 124 (e.g., creating a gap between surface 106 and 124) in order to facilitate cooling between the sleeve 96 and the cam ring 122 along the regions between surface 106 and surface 124, where the contact between the sleeve 96 and the cam ring 122 occurs. Relative rotation between the sleeve 96 and the cam ring 122 may occur, particularly when the sleeve 96 is engaging the second pulley 86 facilitating rotation of the sleeve 96. Such relative rotation may result in friction between the sleeve 96 and the cam ring 122, which may result in increased heat generation. If surface 124 and surface 106 were to directly contact each other in their entireties, it may be difficult to cool the sleeve 96 and the cam ring 122 along surface 106 and surface 124, respectively. The protrusions 128, however, reduce the contact between the cam ring 122 and the sleeve 96 such that the majority of surface 106 is not in contact with the sleeve 96, or more specifically the majority of surface 106 is not in contact with flange 104. Furthermore, the majority of surface 106 and surface 124 are exposed to air within the gap between surface 106 and 124 created by the protrusions 128 to facilitate cooling of the sleeve 96 and the cam ring 122 along surface 106 and surface 124, respectively.

Such engagement between the protrusions 128 and surface 106 on the flange 104 may also operate to facilitate transitioning the sleeve 96 between the first position 98 and second position 100. More specifically, the cam ring 122 may operate to lower the sleeve 96 to the first position and lift or elevate the sleeve 96 to the second position 100 along the contact that occurs between the protrusions 128 and surface 106 on the flange 104.

The protrusions 128 may be equidistantly spaced along the surface 124 of the cam ring 122. The protrusions 128 may include at least three protrusions 128. The protrusions 128 may spiral inward toward a center 130 (e.g., a radial center) of the cam ring 122 (e.g., the protrusions 128 may spiral inward toward axis 102). The cam ring 122 has a diameter 134 and a circumference. Each of the protrusions 128 extends along an angle 136 that ranges between 20° to 40° of the circumference. The protrusions 128 may collectively extend along 60° to 120° of the circumference. The diameter 134 may refer to the outer diameter of the cam ring 122 (as illustrated), the inner diameter of the cam ring 122, or any diameter of the cam ring 122 that is between the inner and outer diameters of the cam ring 122. Spiraling the protrusions 128 distributes the contact between the protrusions 128 and the surface 106 on the flange 104 between the inner and outer diameters of the flange 104 along surface 106. This ensures that heat is not concentrated on one region of the surface 106 on the flange 104 that is somewhere between the inner and outer diameters of the flange 104 along surface 106.

The cam ring 122 has a dimension 138 extending axially with respect to the cam ring 122 (e.g., extending with respect to axis 102) between surface 124 and surface 140 along a bottom of the cam ring 122. Surface 140 may be a bottom surface of the cam ring 122. Surface 140 may face in the first axial direction 108. The protrusions 128 may have dimensions 142 extending axially with respect to the cam ring (e.g., extending with respect to axis 102) between the surface 124 and upper surfaces 144 of the protrusions 128. Dimension 138 may be referred to as the first dimension while dimensions 142 may be referred to as second dimensions. Alternatively, dimensions 142 may be referred to as first dimensions while dimension 138 may be referred to as the second dimension. Dimension 138 may be a height, a vertical dimension, or a vertical thickness of the cam ring 122. Dimensions 142 may be heights or vertical dimensions of the protrusions 128. A ratio between the dimension 138 and each of dimensions 142 may be at least two to one, but is preferably four to one or greater.

The clutch system 94 may further include a casing or clutch housing 146 that houses the cam ring 122 and at least a portion of the sleeve 96 that includes the flange 104. The clutch housing 146 may be secured to a lower housing or panel 148 on the washing machine 10 that houses and/or conceals the transmission 90 and portions of the input shaft 80, the agitator shaft 88, and spin tube 92 along the bottom of the washing machine 10. The cam ring 122 includes cam blocks 150 protruding from surface 140. The cam blocks 150 are configured to engage cammed surfaces 152 within the clutch housing 146. The cam blocks 150 include first ramped surfaces 154. The cammed surfaces 152 include first surfaces 156, second surfaces 158, and second ramped surfaces 160. The first surfaces 156 may be referred to as lower surfaces and the second surfaces 158 may be referred to as elevated surfaces.

The first ramped surfaces 154 are configured to engage second ramped surfaces 160 to transition the cam ring 122 between two positions (e.g., a first position where lower surfaces 161 of the cam blocks 150 engage the first surfaces 156 and a second position where the lower surfaces 161 of the cam blocks 150 engage the second surfaces 158). In the first position of the cam ring 122, where the cam blocks 150 engage the first surfaces 156, the cam ring 122 may be in a lower position. In the second position of the cam ring 122, where the cam blocks 150 engage the second surfaces 158, the cam ring 122 may be in an elevated position. During a transition of the cam ring 122 from the second position to the first position, the cam blocks 150 are lowered from the second surfaces 158 to the first surfaces 156, the cam ring 122 is lowered, and the sleeve 96 is lowered (e.g., the sleeve 96 is transitioned from the second position 100 to the first position 98). The sleeve 96 is lowered during a transition of the cam ring 122 from the second position to the first position via gravity or via a spring 162 that biases the sleeve 96 into engagement with the cam ring 122. More specifically, gravity or the spring 162 may bias surface 106 of the flange 104 of the sleeve 96 into engagement with the protrusions 128. During a transition of the cam ring 122 from the first position to the second position, the cam blocks 150 are elevated from the first surfaces 156 to the second surfaces 158, the cam ring 122 is elevated, and the sleeve 96 is elevated (e.g., the sleeve 96 is transitioned from the first position 98 to the second position 100). The sleeve 96 is elevated during a transition of the cam ring 122 from the second position to the first position via engagement between the protrusions 128 and the surface 106 of the flange 104 of the sleeve 96.

The cam ring 122 is configured to rotate to facilitate the first ramped surfaces 154 engaging the second ramped surfaces 160 to transition the cam ring 122 between the two positions (e.g., the first position where the cam blocks 150 engage the first surfaces 156 and the second position where the cam blocks 150 engage the second surfaces 158). The cam ring 122 may include a lever arm 164. An actuator 166 may be attached to or may engage the lever arm 164 to rotate the cam ring 122 in order to transition the cam ring 122 between the two positions. The actuator 166 may be secured to the lower housing or panel 148. The actuator 166 may be any type of device capable of rotating the cam ring 122. For example, the actuator 166 may be an electric motor (e.g., a servo motor), an electric solenoid, a pneumatic cylinder, a hydraulic cylinder, etc. The actuator 166 may be in communication with and controlled by the controller 70. For example, the controller 70 may be programmed to rotate the cam ring 122 via the actuator 166 to transition the sleeve 96 to the first position 98 during a spin cycle of the washing machine 10 and may be programmed to rotate the cam ring 122 via the actuator 166 to transition the sleeve 96 to the second position 100 during an agitation cycle of the washing machine 10.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A laundry machine comprising:

a spin tube;

an agitator shaft disposed within the spin tube; and a clutch comprising, a sleeve (i) configured to transition between lowered and elevated positions to connect and disconnect the agitator shaft to and from the spin tube, respectively, and (ii) having a flange protruding radially outward therefrom, wherein the flange has a lower surface, and a cam ring (i) disposed radially around the sleeve and (ii) operable to lower and lift the sleeve to transition the sleeve between the lowered and elevated positions, respectively, the cam ring having (a) an upper surface and (b) standoffs extending upward from the upper surface, wherein the standoffs are in engagement with the lower surface of the flange (I) such that the upper surface of the cam ring is spaced-apart from the lower surface of the flange and (II) to facilitate lowering and lifting the sleeve.

2. The laundry machine of claim 1, wherein the standoffs are equidistantly spaced along the upper surface of the cam ring.

3. The laundry machine of claim 1, wherein the standoffs comprise at least three standoffs.

4. The laundry machine of claim 1, wherein the standoffs spiral inward toward a center of the cam ring.

5. The laundry machine of claim 1, wherein (i) the cam ring has a first dimension extending axially with respect to the cam ring between the upper surface and a bottom surface of the cam ring, (ii) the standoffs have second dimensions extending axially with respect to the cam ring between the upper surface of the cam ring and upper surfaces of the standoffs, and (iii) a ratio between the first dimension and each of the second dimensions is at least two to one.

6. The laundry machine of claim 1, wherein the cam ring has a circumference and each of the standoffs extends along 20° to 40° of the circumference.

7. The laundry machine of claim 1, wherein the cam ring has a circumference and the standoffs collectively extend along 60° to 120° of the circumference.

8. A laundry machine comprising:

a drum;

an agitator disposed within the drum; and a clutch comprising, a sleeve (i) configured to transition between first and second positions to connect and disconnect the agitator to and from the drum, respectively, and (ii) having a first surface, and a cam ring operable to transition the sleeve between the first and second positions, the cam ring having (i) a second surface and (ii) protruding regions extending upward from the second surface, wherein the protruding regions spiral inward toward a center of the cam ring, and wherein the protruding regions are in engagement with the first surface of the sleeve (a) such that the first surface of the sleeve is spaced-apart from the second surface of the cam ring and (b) to facilitate transitioning the sleeve between the first and second positions.

9. The laundry machine of claim 8, wherein the sleeve includes a flange protruding radially outward therefrom and (ii) the first surface is defined on the flange.

10. The laundry machine of claim 8, wherein the protruding regions are equidistantly spaced along the second surface.

11. The laundry machine of claim 8, wherein the protruding regions comprise at least three protruding regions.

12. The laundry machine of claim 8, wherein (i) the cam ring has a first dimension extending axially with respect to the cam ring between the second surface and a third surface of the cam ring, (ii) the protruding regions have second dimensions extending axially with respect to the cam ring between the second surface of the cam ring and upper surfaces of the protruding regions, and (iii) a ratio between the first dimension and each of the second dimensions is at least two to one.

13. The laundry machine of claim 8, wherein the cam ring has a circumference and each of the protruding regions extends along 20° to 40° of the circumference.

14. The laundry machine of claim 8, wherein the cam ring has a circumference and the protruding regions collectively extend along 60° to 120° of the circumference.

15. A laundry machine comprising:

a spin tube;

an agitator shaft; and a clutch comprising, a sleeve (i) extending along an axis, (ii) configured to transition between engaged and disengaged conditions to connect and disconnect the agitator shaft to and from the spin tube, respectively, and (iii) having a first surface facing in a first axial direction with respect to the axis, wherein the sleeve includes a flange protruding radially outward therefrom and the first surface is defined on the flange, and a cam (i) extending along the axis and (ii) operable to transition the sleeve between the engaged and disengaged conditions, the cam having (a) a second surface facing in a second axial direction that is opposite to the first axial direction and (b) protrusions extending from the second surface, wherein the protrusions are in engagement with the first surface (I) such that the first surface is spaced-apart from the second surface to facilitate cooling between the first and second surfaces and (II) to facilitate transitioning the sleeve between the engaged and disengaged conditions.

16. The laundry machine of claim 15, wherein the protrusions are equidistantly spaced along the second surface.

17. The laundry machine of claim 15, wherein the protrusions comprise at least three protrusions.

18. The laundry machine of claim 15, wherein the protrusions spiral inward toward a center of the cam.

19. The laundry machine of claim 15, wherein the cam has a circumference and each of the protrusions extends along 20° to 40° of the circumference.

20. The laundry machine of claim 15, wherein the cam has a circumference and the protrusions collectively extend along 60° to 120° of the circumference.

* * * * *